(12) United States Patent
Ossareh et al.

(10) Patent No.: US 9,551,276 B2
(45) Date of Patent: Jan. 24, 2017

(54) METHODS AND SYSTEMS FOR SURGE CONTROL

(71) Applicant: Ford Global Technologies, LLC, Dearborn, MI (US)

(72) Inventors: Hamid-Reza Ossareh, Ann Arbor, MI (US); Paul Martin Niessen, Plymouth, MI (US)

(73) Assignee: Ford Global Technologies, LLC, Dearborn, MI (US)

(*) Notice: Subject to any disclaimer, the term of this patent is extended or adjusted under 35 U.S.C. 154(b) by 260 days.

(21) Appl. No.: 14/460,304

(22) Filed: Aug. 14, 2014

(65) Prior Publication Data

US 2016/0047338 A1 Feb. 18, 2016

(51) Int. Cl.
| F02B 33/44 | (2006.01) |
| F02B 37/16 | (2006.01) |
| F02M 25/07 | (2006.01) |
| F02B 37/18 | (2006.01) |
| F02D 23/00 | (2006.01) |
| F02B 37/12 | (2006.01) |

(52) U.S. Cl.
CPC ............ *F02B 37/16* (2013.01); *F02B 37/18* (2013.01); *F02D 23/00* (2013.01); *F02M 25/0706* (2013.01); *F02M 25/077* (2013.01); *F02B 2037/125* (2013.01); *Y02T 10/144* (2013.01)

(58) Field of Classification Search
CPC ..... F02B 37/16; F02B 37/18; F02B 2037/125; F02D 23/00; Y02T 10/144
See application file for complete search history.

(56) References Cited

U.S. PATENT DOCUMENTS

| 4,949,276 | A | * | 8/1990 | Staroselsky | ......... F04D 27/0284 415/1 |
| 5,798,941 | A | * | 8/1998 | McLeister | .............. G05B 11/42 415/1 |
| 6,079,210 | A | | 6/2000 | Pintauro et al. | |
| 6,422,219 | B1 | | 7/2002 | Savonen et al. | |
| 7,578,128 | B2 | * | 8/2009 | Miyauchi | ................ F02B 37/16 123/561 |
| 7,640,744 | B2 | | 1/2010 | Rollinger et al. | |
| 8,272,215 | B2 | | 9/2012 | Shu et al. | |

(Continued)

OTHER PUBLICATIONS

Anonymous, "Fuel cell system operation of air compressor in surge for low power," IPCOM No. 000225308, Published Feb. 7, 2013, 3 pages.

(Continued)

*Primary Examiner* — Mahmoud Gimie
*Assistant Examiner* — David Hamaoui
(74) *Attorney, Agent, or Firm* — Julia Voutyras; Alleman Hall McCoy Russell & Tuttle LLP (57) ABSTRACT

Systems and methods are provided for reducing surge in a boosted engine system. One method comprises adjusting an opening of a compressor recirculation valve to allow a compressor recirculation flow based on a combination of a nominal compressor recirculation flow and a filtered nominal compressor recirculation flow. The nominal compressor recirculation flow may be calculated as a difference between a desired compressor flow rate based on a surge limit of compressor and an estimated throttle mass flow rate.

6 Claims, 5 Drawing Sheets

(56) References Cited

U.S. PATENT DOCUMENTS

| | | | |
|---|---|---|---|
| 8,302,402 B2* | 11/2012 | Boley | F02B 37/16 60/611 |
| 8,739,530 B2* | 6/2014 | Bjorge | F02B 37/001 123/562 |
| 9,279,374 B2* | 3/2016 | Buckland | F02B 37/127 |
| 2008/0177456 A1 | 7/2008 | Hill et al. | |
| 2011/0094480 A1 | 4/2011 | Suhocki et al. | |
| 2012/0183385 A1* | 7/2012 | Narayanan | F04D 27/0223 415/1 |
| 2014/0238368 A1 | 8/2014 | Jammoussi et al. | |
| 2015/0300281 A1* | 10/2015 | Sivasubramanian | F02D 41/0027 701/104 |

OTHER PUBLICATIONS

Jankovic, Mrdjan J. et al., "Methods and Systems for Boost Control," U.S. Appl. No. 13/829,648, filed Mar. 14, 2013, 39 pages.

Jammoussi, Hassene et al., "Exhaust Gas Sensor Controls Adaptation for Asymmetric Degradation Responses," U.S. Appl. No. 13/901,441, filed May 23, 2013, 48 pages.

Hendrickson, Cory S. et al., "Filtering Method for Intermittent Ultrasonic Level Sensors," U.S. Appl. No. 13/940,140, filed Jul. 11, 2013, 49 pages.

Buckland, Julia H. et al., "Methods and Systems for Surge Control," U.S. Appl. No. 13/965,725, filed Aug. 13, 2013, 38 pages.

* cited by examiner

METHODS AND SYSTEMS FOR SURGE CONTROL

FIELD

The present application relates to methods and systems for using compressor recirculation flow to improve surge control.

BACKGROUND AND SUMMARY

Engine systems may be configured with boosting devices, such as turbochargers or superchargers, for providing a boosted aircharge and improving peak power outputs. The use of a compressor allows a smaller displacement engine to provide as much power as a larger displacement engine, but with additional fuel economy benefits. However, compressors are prone to surge. For example, when an operator tips-out of an accelerator pedal, an engine intake throttle closes, leading to reduced forward flow through the compressor, and a potential for surge. Surge can lead to noise, vibration, and harshness (NVH) issues such as undesirable noise from the engine intake system. In extreme cases, surge may result in compressor damage. To address compressor surge, engine systems may include a compressor recirculation valve (CRV) coupled across the compressor to enable rapid decaying of boost pressure. The CRV may recirculate compressed air from the compressor outlet to the compressor inlet.

One example of using a compressor recirculation valve to reduce surge is shown by Bjorge et al. in U.S. Pat. No. 8,739,530. Therein, the disclosed embodiment includes two compressors and a compressor recirculation valve coupled across each compressor. Each compressor recirculation valve is actuated open based on a desired flow rate through the respective compressor to avoid surge. The desired flow rate for each compressor may be calculated as a difference between throttle mass flow rate and mass flow through each compressor at a respective surge line on a compressor map.

The inventors herein have identified potential issues with such an approach. As one example, delays in actuating the compressor recirculation valves may lead to a slower than desired opening of the valves. During conditions such as an aggressive accelerator pedal tip-out, actuator delays may substantially reduce compressor flow rate and lead to compressor surge. Further, in an example when a throttle flow estimate is used to determine the desired compressor flow rate, errors in the throttle flow estimate may increase the likelihood of surge.

In one example, some of the above issues may be addressed by a method for an engine comprising: routing compressed air from a compressor through a throttle into an engine, diverting a portion of the compressed air away from the throttle through a recirculation valve to prevent the portion of the compressed air from flowing back into the compressor causing compressor surge, and diverting a further portion of the compressed air in response to a change in position of the throttle above a threshold change.

In another example, a method for a boosted engine comprises directing additional compressor recirculation flow from upstream of a throttle to a compressor inlet via a compressor recirculation valve, the additional compressor recirculation flow based on a filtered difference between a minimum desired compressor flow to reduce compressor surge and existing airflow through the throttle.

Thus, a compressor flow rate can be maintained above a flow rate at the surge line and compressor operation may be kept outside a surge region during transient engine operating conditions.

For example, an engine system may include a compressor having a compressor recirculation passage coupling an outlet of the compressor to the compressor inlet. In alternate embodiments, the recirculation path may couple an outlet of a charge air cooler to the compressor inlet. Flow through the recirculation path may be controlled via a continuously variable compressor recirculation valve (CCRV). An engine controller may be configured to continually adjust a position of the CCRV, during steady-state and transient engine operating conditions, based on changes in airflow through an intake throttle so as to maintain a compressor flow rate at or above a surge constrained flow rate (that is, a compressor flow rate at or above a surge limit of the compressor). During transient operating conditions (e.g. a sudden tip-out), the controller may increase an opening of the CCRV to direct an increased recirculation flow to the compressor inlet. The CCRV opening may be increased substantially only when throttle position undergoes a change in position that is higher than a predetermined threshold. Further, the increase in the opening of the CCRV may be based on a filtered difference between a minimum desired compressor flow to reduce compressor surge and existing airflow through the intake throttle. In one example, the filtered difference may be determined via a lead compensator.

In this way, by increasing recirculation flow through the compressor recirculation path during rapid transients, a compressor flow rate can be kept sufficiently high. This enables compressor operation to remain outside a surge region during sudden transients. By applying a filter to the difference between surge constrained flow rate and throttle mass flow via a lead compensator, a speed of response of the CCRV may be increased. Overall, surge margin under all engine operating conditions may be improved, and surge related NVH issues and component damage issues may be reduced. Further, engine performance and drivability may be improved.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

DETAILED DESCRIPTION

Figure 1:
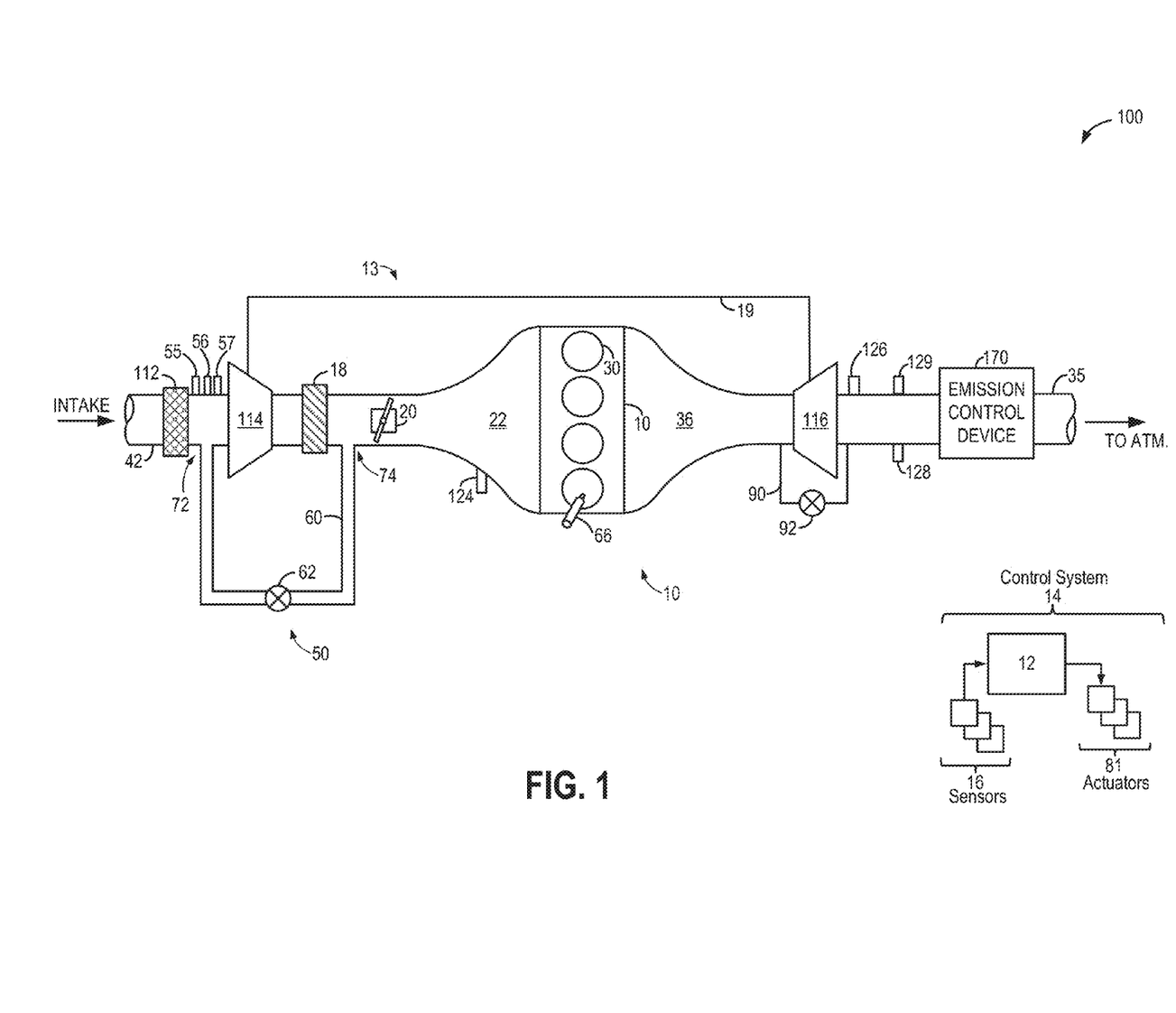
FIG. 1 depicts an example embodiment of a boosted engine system including a compressor recirculation valve.
Figure 2A:
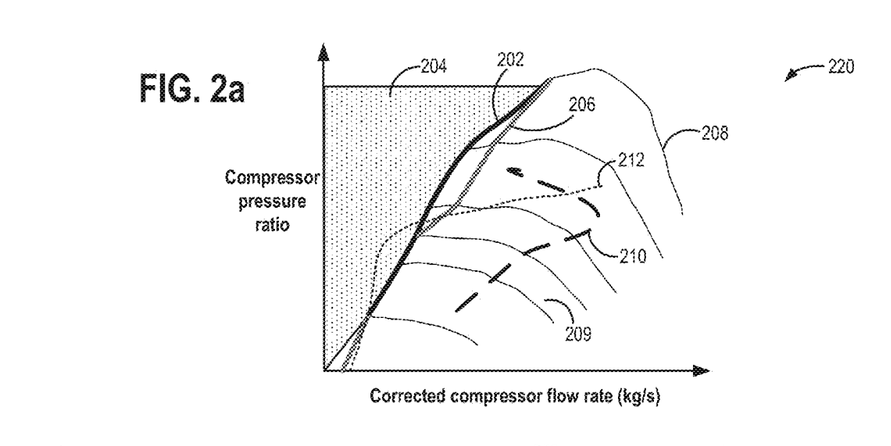
FIGS. 2a, 2b, and 2c show example compressor maps demonstrating the effect of different parameters on compressor operation.
Figure 2B:
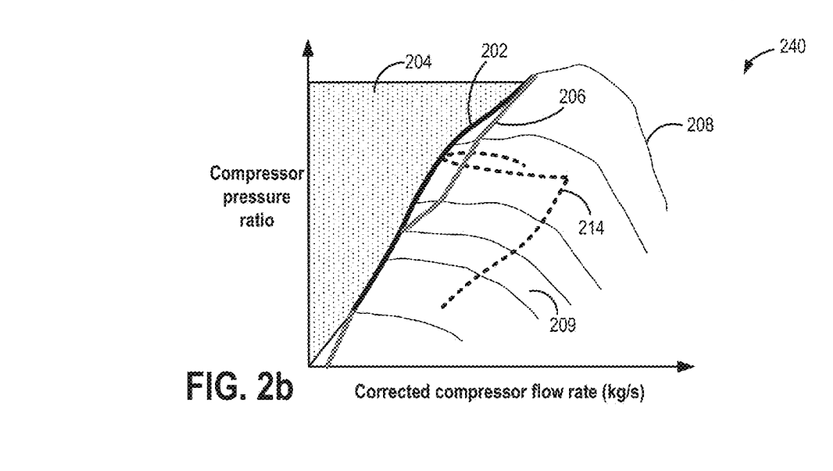
Figure 2C:
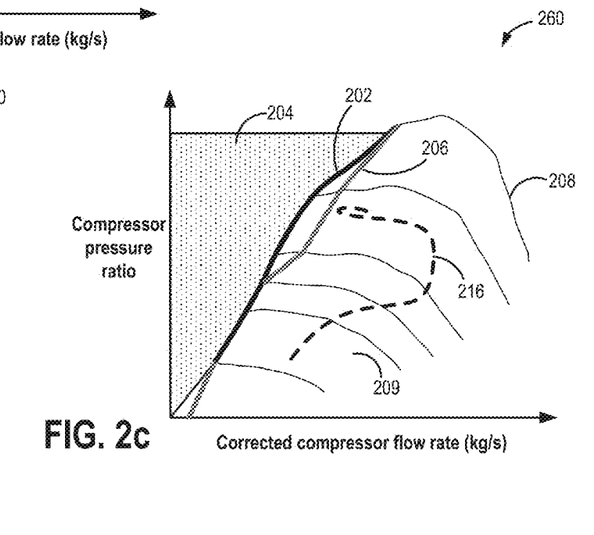

The following description relates to systems and methods for reducing compressor surge in a boosted engine system, such as the system of FIG. 1. A controller may be configured to perform a control routine, such as the routine of FIG. 3, to adjust compressor recirculation flow through a recirculation path to the compressor inlet based on operating conditions. The controller may increase compressor recirculation flow during transient operating conditions, such as aggressive tip-outs. The increase in compressor recirculation flow may be related to a filtered nominal compressor flow rate, where the nominal compressor flow rate is a difference between a minimum compressor flow rate to prevent surge and an existing throttle mass flow. The controller may learn the filtered difference and a required additional flow to reduce surge by performing a control routine such as the routine of FIG. 4. In an example system without actuator delays wherein an actual throttle flow may be measured, compressor surge may be reduced by using an unfiltered nominal compressor flow rate (FIG. 2a). However, presence of actuator delays and using throttle flow estimates can result in compressor surge (FIG. 2b). Herein, using the filtered nominal compressor flow rate may reduce the likelihood of compressor surge, as shown by FIG. 2c. The compressor recirculation flow may be adjusted based on various conditions to preserve a desired surge margin (FIG. 5). In this way, a margin to surge can be improved during transient conditions.

FIG. 1 schematically show aspects of an example engine system 100 including an engine 10. In the depicted embodiment, engine 10 is a boosted engine coupled to a turbocharger 13 including a compressor 114 driven by a turbine 116. Specifically, fresh air is introduced along intake passage 42 into engine 10 via air cleaner 112 and flows to compressor 114. The compressor may be any suitable intake-air compressor, such as a motor-driven or driveshaft driven supercharger compressor. In engine system 100, however, the compressor is a turbocharger compressor mechanically coupled to turbine 116 via a shaft 19, the turbine 116 driven by expanding engine exhaust. In one embodiment, the compressor and turbine may be coupled within a twin scroll turbocharger. In another embodiment, the turbocharger may be a monoscroll type or a variable geometry turbocharger (VGT), where turbine geometry is actively varied as a function of engine speed.

As shown in FIG. 1, compressor 114 is coupled, through charge-air cooler (CAC) 18 (herein also referred to as an intercooler) to throttle valve 20. Throttle valve 20 (also termed, intake throttle 20) is coupled to engine intake manifold 22. From the compressor, the compressed aircharge flows through the charge-air cooler 18 and the throttle valve 20 to the intake manifold 22. The charge-air cooler 18 may be an air-to-air or air-to-water heat exchanger, for example. In the embodiment shown in FIG. 1, the pressure of the aircharge within the intake manifold is sensed by manifold air pressure (MAP) sensor 124 and the flow rate of aircharge entering the intake manifold can be estimated using this measurement.

One or more sensors may be coupled to an inlet of compressor 114. For example, a temperature sensor 55 may be coupled to the inlet for estimating a compressor inlet temperature. A pressure sensor 56 may be coupled to the inlet for estimating a compressor inlet pressure, and a humidity sensor 57 may be coupled to the inlet for estimating a humidity of aircharge entering the compressor. Still other sensors may include, for example, air-fuel ratio sensors, etc. In other examples, one or more of the compressor inlet conditions (such as humidity, temperature, etc.) may be inferred based on engine operating conditions.

During selected conditions, such as during a tip-out, when throttle angle is reduced, compressor surge can occur. This is due to the reduction in forward flow through the compressor, increasing the propensity for surge. In addition, surge can lead to NVH issues such as undesirable noise from the engine intake system and to engine performance issues. To relieve boost pressure and reduce compressor surge, at least a portion of the aircharge compressed by compressor 114 may be recirculated to the compressor inlet 72 via a compressor recirculation system 50. This allows higher compressor flow, which can alleviate surge.

Compressor recirculation system 50 may include a compressor recirculation path 60 for recirculating compressed air across the compressor. The compressor recirculation path 60 may be configured for recirculating compressed airflow from downstream of charge-air cooler 18 and upstream of intake throttle 20 (as shown by 74) to the compressor inlet 72. In this way, the compressor recirculation path may recirculate cooled compressed air to the compressor inlet. In alternate embodiments, the compressor recirculation path may be configured for recirculating compressed airflow from upstream of the charge air cooler to the compressor inlet. Flow through compressor recirculation path 60 may be controlled by adjusting a valve 62 coupled in the recirculation path. In the depicted example, valve 62 is a continuously variable compressor recirculation valve (CCRV) wherein a position of the valve is continuously variable from a fully closed position to a fully open position. For example, the valve may be configured as a butterfly or poppet valve. In the depicted example, CCRV 62 may be an electrically actuated valve. However, in alternate embodiments, the valve may be pneumatically controlled via either pressure or vacuum actuation. It will be appreciated that the compressor recirculation valve may also be termed a compressor bypass valve (CBV).

Intake manifold 22 is shown coupled to a series of combustion chambers 30 through a series of intake valves (not shown). The combustion chambers are further coupled to exhaust manifold 36 via a series of exhaust valves (not shown). In the depicted embodiment, a single exhaust manifold 36 is shown. However, in other embodiments, the exhaust manifold may include a plurality of exhaust manifold sections. Configurations having a plurality of exhaust manifold sections may enable effluent from different combustion chambers to be directed to different locations in the engine system.

In one embodiment, each of the exhaust and intake valves may be electronically actuated or controlled. In another embodiment, each of the exhaust and intake valves may be cam actuated or controlled. Whether electronically actuated or cam actuated, the timing of exhaust and intake valve opening and closure may be adjusted as needed for desired combustion and emissions-control performance.

Combustion chambers 30 may be supplied one or more fuels via fuel injector 66. Fuels may include gasoline, alcohol fuel blends, diesel, biodiesel, compressed natural gas, etc. Fuel may be supplied to the combustion chambers via direct injection, port injection, throttle valve-body injection, or any combination thereof. In the combustion chambers, combustion may be initiated via spark ignition and/or compression ignition. It will be noted that a single fuel injector 66 is depicted in FIG. 1 and though not shown, each combustion chamber 30 may be coupled with a respective fuel injector 66.

As shown in FIG. 1, exhaust from the one or more exhaust manifold sections may drive turbine 116. When reduced turbine torque is desired, some exhaust may be directed instead through bypass passage 90, by-passing the turbine 116. A wastegate 92 may be actuated open to dump at least some exhaust pressure from upstream of turbine 116 to a location downstream of the turbine via bypass passage 90. By reducing exhaust pressure upstream of the turbine 116, turbine speed can be reduced, which in turn helps to reduce boost pressure. However, due to the dynamics of the turbocharger 13, the effects of adjustments to CCRV 62 on reducing surge may be faster than the effects of the wastegate adjustments.

The combined flow from the turbine 116 and the wastegate 92 then flows through emission control device 170. In general, one or more emission control devices 170 may include one or more exhaust after-treatment catalysts configured to catalytically treat the exhaust flow, and thereby reduce an amount of one or more substances in the exhaust flow. For example, one exhaust after-treatment catalyst may be configured to trap NO from the exhaust flow when the exhaust flow is lean, and to reduce the trapped NO when the exhaust flow is rich. In other examples, an exhaust after-treatment catalyst may be configured to disproportionate NO or to selectively reduce NO with the aid of a reducing agent. In still other examples, an exhaust after-treatment catalyst may be configured to oxidize residual hydrocarbons and/or carbon monoxide in the exhaust flow. Different exhaust after-treatment catalysts having any such functionality may be arranged in wash coats or elsewhere in the exhaust after-treatment stages, either separately or together. In some embodiments, the exhaust after-treatment stages may include a regenerating soot filter configured to trap and oxidize soot particles in the exhaust flow. All or part of the treated exhaust from emission control device 170 may be released into the atmosphere via exhaust conduit 35.

In some embodiments, the engine system may be further configured for exhaust gas recirculation. In those embodiments, depending on operating conditions, a portion of the exhaust gas released from the cylinders may be diverted along an EGR passage (not shown) and via an EGR cooler to the compressor inlet, from downstream of the turbine. An EGR valve coupled to the EGR passage may be opened to admit a controlled amount of cooled exhaust gas to the compressor inlet for desirable combustion and emissions-control performance.

Engine system 100 may further include control system 14. Control system 14 is shown receiving information from a plurality of sensors 16 (various examples of which are described herein) and sending control signals to a plurality of actuators 81 (various examples of which are described herein). As one example, sensors 16 may include an exhaust gas sensor located upstream of the emission control device (not shown), MAP sensor 124, exhaust temperature sensor 128, exhaust pressure sensor 129, compressor inlet temperature sensor 55, compressor inlet pressure sensor 56, compressor inlet humidity sensor 57, and air-fuel ratio sensor 126. Other sensors such as additional pressure, temperature, air/fuel ratio, and composition sensors may be coupled to various locations in engine system 100. The actuators 81 may include, for example, throttle valve 20, CCRV 62, wastegate 92, and fuel injector 66. The control system 14 may include a controller 12. The controller may receive input data from the various sensors, process the input data, and trigger various actuators in response to the processed input data based on instruction or code programmed therein corresponding to one or more routines. Example control routines are described below with regard to FIGS. 3 and 4.

As elaborated herein, based on operating conditions, the CCRV 62 may vary a recirculation flow across the compressor 114. As used herein, the recirculation flow across the compressor refers to a net flow from upstream of intake throttle 20 to the compressor inlet 72 via the compressor recirculation path 60. The recirculation flow across the compressor may be continuously adjusted based on a difference between a minimum desired compressor flow rate to reduce surge and throttle mass flow. The recirculation flow may also be based on filtering the above difference using a lead compensator to enable faster response of the compressor recirculation valve actuator. By enabling a faster response of the CCRV, a flow rate through the compressor can be kept sufficiently high and can be maintained at or above a surge constrained compressor flow rate even during sudden transients such as a fast decrease in throttle valve opening. In alternate embodiments, however, the recirculation flow across the compressor may refer to a net flow from upstream of the charge-air cooler 18 to the compressor inlet 72.

Engine controller 12 may use a map, such as the compressor maps of FIGS. 2a, 2b, and 2c, to identify whether the compressor is operating in or around a surge region. In particular, each of maps 220 of FIG. 2a, 240 of FIG. 2b, and 260 of FIG. 2c shows a change in compressor pressure ratio (along the y-axis) at different compressor flow rates (along the x-axis). Maps 220, 240, and 260 include contour lines 208 representing a constant compressor speed. Line 202 depicts a surge limit (herein, a hard surge limit) for given operating conditions. In one example, line 202 may be suggested according to manufacturer guidelines. Compressor operation to the left of hard surge limit 202 results in operation in a hard surge region 204 (dotted region). As such, compressor operation in surge region 204 can cause objectionable NVH and potential degradation of engine performance.

Compressor maps 220, 240, and 260 further depict a soft surge limit (line 206) that may also lead to objectionable NVH, albeit less severe. Alternatively, line 206 may represent a calibrated surge limit that offers a safety margin to avoid hard surge. Line 206 may be calibrated based on compressor flow rate at different conditions, response times of the CCRV, pressure differentials, etc. In another embodiment, line 206 may be calibrated as an offset at a predetermined percentage from the hard surge limit 202. The CCRV opening can be adjusted to move compressor operation out of soft surge that is, to the right of soft surge limit or calibrated offset line 206, into no-surge region 209. In doing so, surge may be immediately reduced, and boosted engine performance may be improved.

Maps 220, 240, and 260 are similar to each other in that each of the maps depict the same surge regions, surge limits, etc. The maps only differ from each other in their portrayal of different compressor operations shown by lines 210, 212, 214, and 216.

Plot 212 (small-dashes line) in map 220 of FIG. 2a illustrates an example change in compressor operation during an operator pedal tip-out. Therein, the rapid closing of the intake throttle causes flow through the compressor to decrease very quickly while the compressor exit pressure decreases relatively slowly (or in some case, rises). This forces compressor operation to the left of line 202, into hard surge region 204, for an extended period. When the compressor exit pressure decreases further, the pressure differential across the compressor reduces. As a result, compressor operation eventually moves to the right of line 202, next to the right of soft surge limit line 206, and subsequently into no-surge region 209. However, the extended period in the hard surge region (and soft surge region) can cause issues such as NVH, as well as compressor hardware damage. During such conditions, the CCRV can be opened to more rapidly move compressor operation to the right of the surge line.

Nonetheless, during a rapid decrease in throttle opening and a corresponding sharp decline in throttle mass flow rate, compressor surge may yet occur due to delays in CCRV response. Plots 210, 214, and 216 in FIGS. 2a, 2b, and 2c depict changes in compressor operation during an example of a large tip-out in different systems. Plot 210 in FIG. 2a shows an operating trajectory of an engine system wherein CCRV actuator delays are absent and wherein actual throttle flow may be known. For example, actual throttle mass flow rate may be determined by learning manifold pressure from an MAP sensor such as sensor 124 of FIG. 1. Herein, compressor operation as depicted by plot 210 (large dashes) may avoid surge limit 206 due to timely opening of the CCRV.

However, when CCRV actuator delays are present, the CCRV may not open quickly and sufficiently in response to rapid decreases in throttle mass flow rate. Consequently, compressor recirculation flow may be lower, and compressor flow rate may decrease below the minimum desired to avoid surge. This example is depicted in map 240 of FIG. 2b by plot 214 where compressor flow rate reduces (with minimal change in compressor pressure ratio) and compressor operation reaches hard surge limit 202. Therefore, hard surge can occur when the CCRV actuator responds at a rate that is slower than desired during conditions when engine airflow requirement suddenly decreases, such as during an aggressive tip-out. As an example, a CCRV actuator delay of 15 milliseconds may result in compressor surge. Compressor operation may also follow plot 214 when an estimate of throttle mass flow is used and actual throttle mass flow is not known.

One approach to improve the surge margin and maintain compressor state in the no-surge region includes controlling the compressor flow rate to always be at least a minimal flow rate. A minimum desired compressor flow to avoid surge (that is, a compressor flow rate at the hard surge line) $\dot{m}_{SL}$, may be determined as follows:

$$\dot{m}_{SL} = f(P_{out}/P_{in}) \quad (1)$$

wherein, $P_{out}$ is a pressure at the outlet of the compressor, $P_{in}$ is a pressure at the inlet of the compressor, and f(.) defines a surge limit (e.g. hard surge limit, soft surge limit). Prior to hard surge, the flow rate through the compressor may be approximately the same as that through the throttle. In other words, flow through the compressor may be the same as the flow out of the boost volume. Therefore, during a tip-out, opening CCRV 62 to maintain the flow rate out of the boost volume can maintain the flow rate through the compressor. Thus, if throttle mass flow, $\dot{m}_{thr}$ is less than $\dot{m}_{SL}$, a controller may be configured to open CCRV 62 and adjust a nominal recirculation flow, $\dot{m}_{nom}$ so that it compensates for the difference between $\dot{m}_{SL}$ and $\dot{m}_{thr}$. Therefore, nominal recirculation flow rate, $\dot{m}_{nom}$ may be:

$$\dot{m}_{nom} = \dot{m}_{SL} - \dot{m}_{thr} \quad (2)$$

Herein, $\dot{m}_{thr}$ may be an estimate of actual throttle mass flow. As such, there may be engine operating conditions that require no compressor recirculation flow to robustly avoid the hard and/or soft surge regions while other engine operating conditions may require continuous recirculation flow, even at steady-state conditions.

As mentioned earlier, during transient conditions that involve rapid changes in throttle mass flow such as aggressive tip-outs, or when throttle flow estimates are used, compressor surge may continue to occur. Accordingly, in the present disclosure, one approach to reduce compressor surge during transient conditions includes increasing the recirculation flow when a change in throttle position is higher than a predetermined threshold. The increase in recirculation flow may be related to a filtered nominal recirculation flow. To elaborate, the difference between the minimum flow required to prevent surge and existing airflow through the throttle may be filtered via a lead compensator to enable a faster response to sudden transient conditions. This approach will be further described in reference to FIGS. 3 and 4 below.

Figure 3:
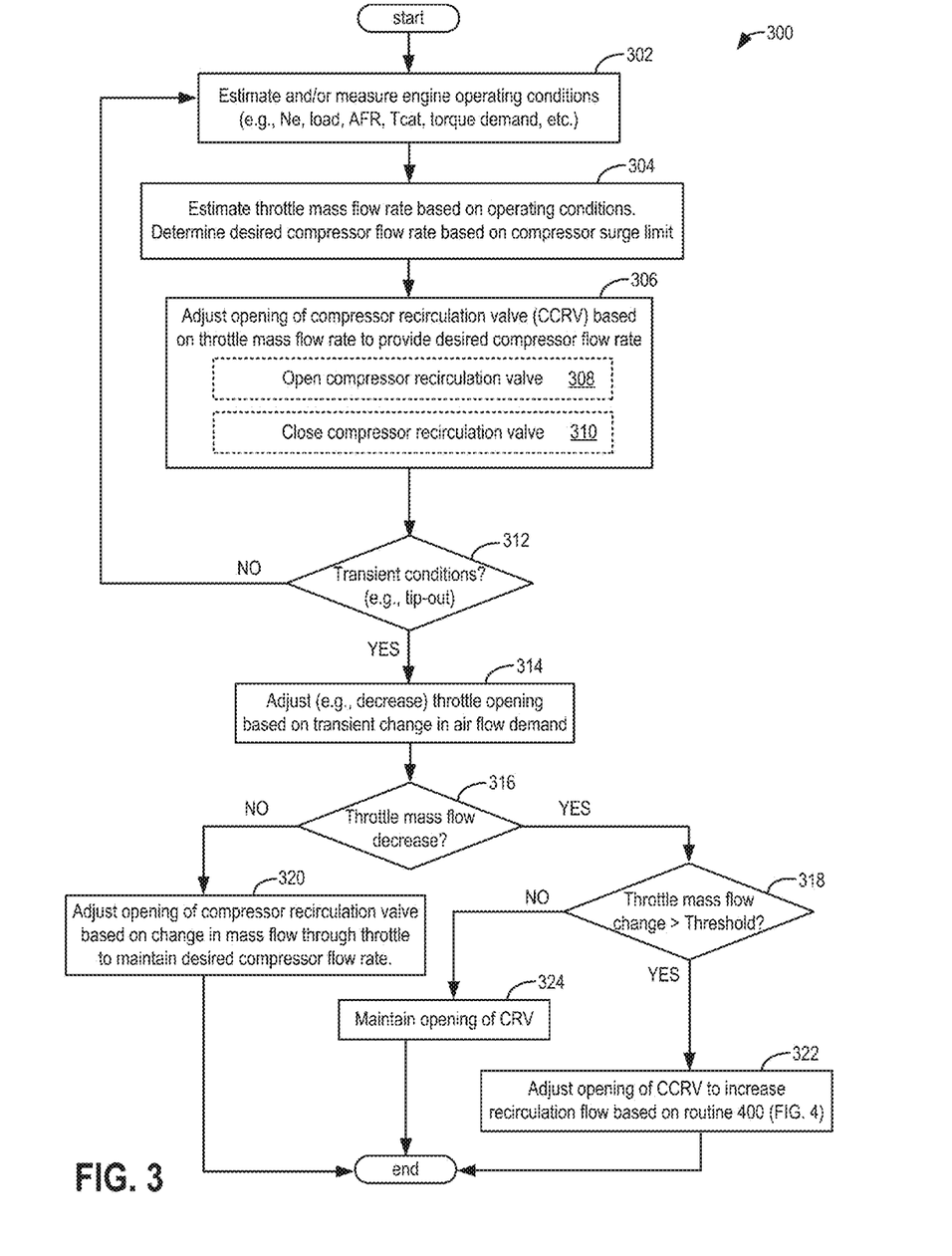
FIG. 3 portrays a high level flow chart illustrating a routine that may be implemented for adjusting compressor recirculation flow in the engine system of FIG. 1 specifically during transient operation.

Turning now to FIG. 3, it shows an example routine 300 for demonstrating control of a continuously variable compressor recirculation valve (CCRV) to reduce surge. Specifically, a degree of opening of the CCRV may be adjusted based on engine conditions, and the degree of opening of the CCRV may be increased during conditions including substantial decreases in throttle mass flow.

At 302, the routine includes estimating and/or measuring engine operating conditions. The estimated conditions may include, for example, engine speed (Ne), torque demand, boost pressure, MAP, engine temperature, combustion air-fuel ratio (AFR), exhaust catalyst temperature, ambient conditions (e.g. BP), etc.

At 304, the routine includes estimating the throttle mass flow based on operating conditions. For example, the throttle mass flow may be estimated based on a sensor output (e.g., MAP sensor output) or from desired throttle mass flow. In another example, throttle mass flow may be estimated based on throttle position and engine speed. In yet another example, a mass airflow sensor may help determine throttle mass flow. In addition, a minimum desired compressor flow rate to avoid surge may be estimated based on the throttle mass flow rate and a compressor surge limit. As such, the minimum desired compressor flow rate may be a surge constrained compressor flow rate that is based on a hard surge limit of the compressor.

At 306, the routine includes adjusting an opening of the continuously variable compressor recirculation valve (CCRV) based on estimated throttle mass flow rate. It will be appreciated that the estimating of the throttle mass flow and the desired compressor flow rate may be performed during all engine operating conditions including during steady-state and transient conditions. By continually estimating the throttle mass flow and adjusting a compressor recirculation flow in accordance to maintain the compressor flow rate at or above the desired compressor flow rate, the compressor state may be maintained outside of (specifically, to the right of) a hard surge and a soft surge limit.

The adjusting of the valve may include, for example, to reduce compressor surge, at 308, opening the CCRV. A difference between the minimum desired compressor flow rate and estimated throttle mass flow rate may determine a degree of opening of the CCRV. As another example, during steady-state conditions, at 310, the controller may close the CCRV. Herein, throttle mass flow rate may be equal to or higher than minimum desired compressor flow rate to avoid surge and the demand for compressor recirculation flow may be reduced, or non-existent.

Next, at 312, the controller may determine if transient conditions are present. For example, an operator tip-in may have occurred. Alternatively, a sudden tip-out condition may have occurred. If transient conditions are not present at 312, routine 300 returns to 302 to continue monitoring engine operating conditions. Further, adjustments to the CCRV may be performed so as to maintain the compressor flow rate sufficiently high and thereby, maintain the compressor state outside the surge region. If, at 312, transient conditions are confirmed, then at 314, throttle opening may be adjusted in response to the existing transient condition. For example, in response to a tip-in, throttle opening may be increased. In another example, in response to a tip-out, throttle opening may be decreased responsive to the drop in engine airflow demand. As such, the change in throttle opening may lead to a corresponding change in throttle mass flow. The controller may monitor the throttle and update (e.g., recalculate) the throttle mass flow rate based on the change in throttle opening.

At 316, the controller may determine if the transient condition includes a decrease in throttle mass flow. As explained above, a reduction in throttle mass flow may occur during a tip-out. If it is confirmed that a decrease in throttle mass flow has not occurred, at 320, the compressor recirculation flow may be revised in view of the change to the throttle mass flow rate so that the desired compressor flow rate can be maintained. Thus, if the throttle mass flow rate increases due to the transient, the recirculation flow may be correspondingly decreased (e.g., by reducing the opening of the CCRV) so that the resulting compressor flow rate is at or above the surge constrained compressor flow rate. As another example, if the throttle mass flow rate is greater than the surge constrained compressor flow rate, the CCRV may be closed.

If at 316, it is instead confirmed that throttle mass flow has decreased, at 318, it may be determined if the decrease in throttle mass flow exceeds a predetermined threshold. In one example, the predetermined threshold may be 25%. In another example, the preselected threshold may be smaller, e.g. 15%. In another embodiment, instead of determining the change in throttle mass flow, routine 300 may confirm if a change in throttle position is above a threshold. Throttle position may be learned from a throttle position sensor. For example, during a sudden tip-out, throttle position may change significantly, e.g. from mostly open to fully closed.

If it is determined that the decrease in throttle mass flow is greater than the predetermined threshold, at 322, the opening of the CCRV is adjusted to increase compressor recirculation flow rate. The increase may be determined according to routine 400 of FIG. 4 which will be elaborated below. On the other hand, if it is determined that the decrease in throttle mass flow is below the threshold, at 324 the CCRV opening (e.g. that selected at 308) may be maintained.

In this way, the controller may divert a portion of compressed air away from the throttle to prevent a flowing back of the compressed air into the compressor during surge conditions. The portion of diverted compressed air may be diverted through a compressor recirculation valve in relation to an estimate of airflow through the throttle. A further portion of compressed air may be diverted in response to a change in position of the throttle, the change in position being greater than a threshold change. Alternatively, the further portion of compressed air may be diverted based on a change in throttle mass flow, wherein the change includes a decrease in throttle mass flow that is higher than a predetermined threshold. The recirculation valve may be a variable compressor recirculation valve, and the portion of compressed air may be diverted by electronically controlling the variable compressor recirculation valve. The portion of compressed air may be diverted when airflow through the throttle is less than a minimum flow of compressed air needed to prevent compressor surge. Further, the diverted portion of compressed air may be diverted in relation to a difference between the minimum flow required to prevent compressor surge and airflow through the throttle.

Figure 4:
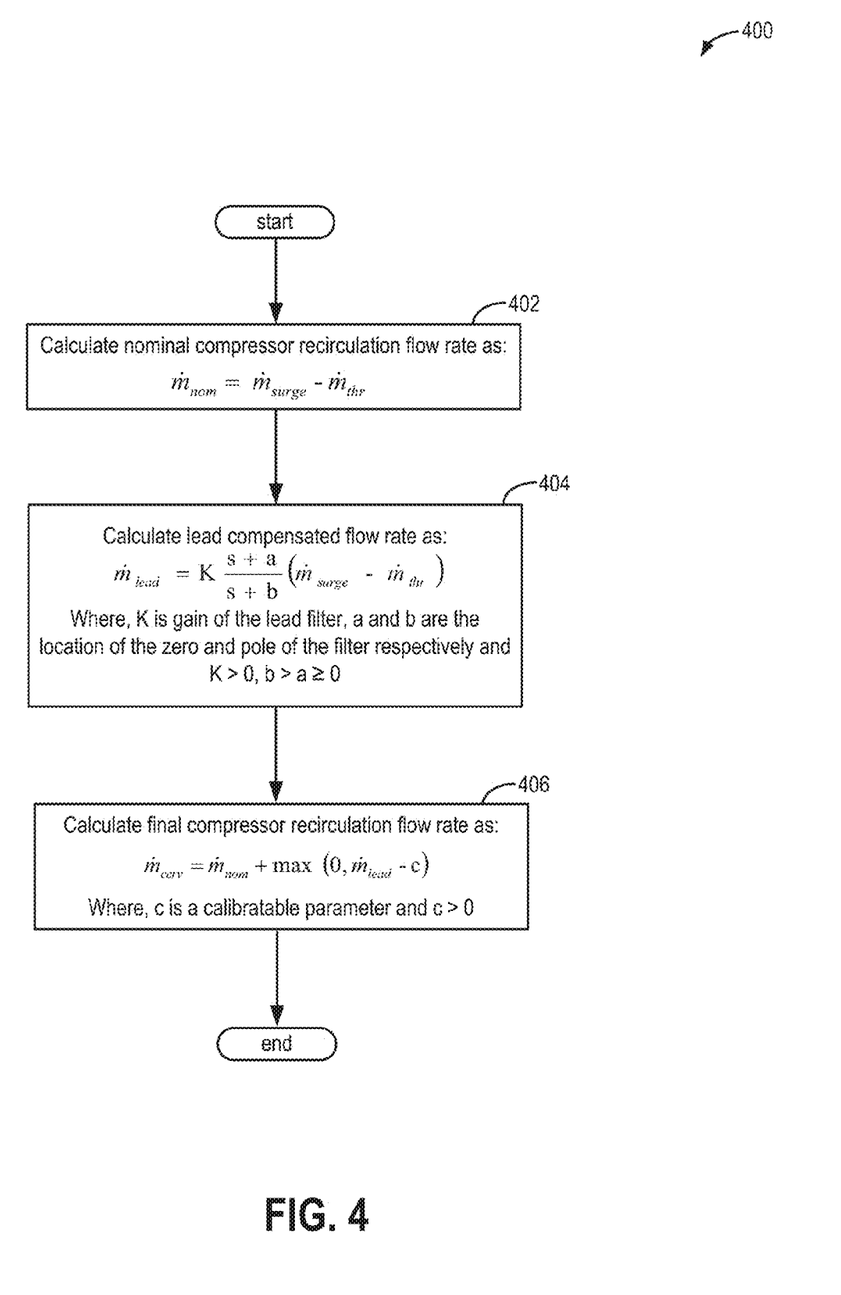
FIG. 4 is a high level flow chart illustrating a routine that may be implemented to calculate compressor recirculation flow, in accordance with the present disclosure.
Figure 5:
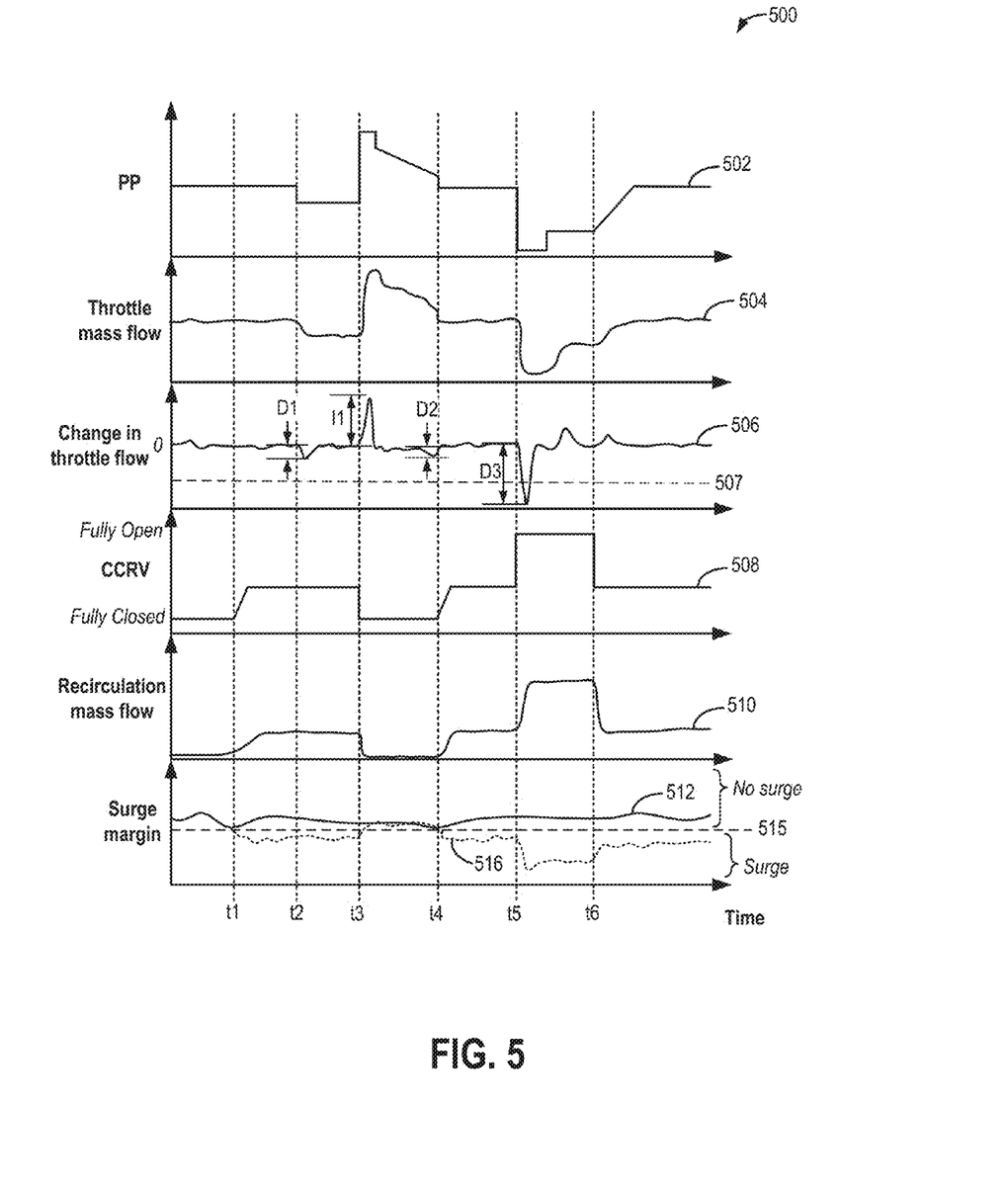
FIG. 5 demonstrates example compressor recirculation valve adjustments during varying engine operating conditions, according to the present disclosure.

FIG. 4 depicts routine 400 for determining a minimum compressor recirculation flow to avoid compressor surge during rapid transients. Specifically, the routine includes estimating a filtered version of the nominal desired compressor recirculation flow rate of equation (2) to learn a modified recirculation flow.

At 402, the nominal compressor recirculation flow rate is calculated as follows:

$$\dot{m}_{nom} = \dot{m}_{SL} - \dot{m}_{thr}. \quad (2)$$

As such, the nominal flow rate is the difference between a minimum desired compressor flow to reduce surge ($\dot{m}_{SL}$) and an existing airflow through the throttle ($\dot{m}_{thr}$). The airflow through the throttle may be an estimate. In one example, the nominal flow rate may be used when transient conditions do not include rapid changes.

Next, at 404, a filtered version of the nominal flow rate may be calculated. In the present disclosure, the filtered difference may be estimated by using a lead compensator to improve speed of response of the CCRV actuator during rapid transients. The lead compensated flow rate, $\dot{m}_{lead}$ may be calculated as follows:

$$\dot{m}_{lead} = K \frac{s+a}{s+b} (\dot{m}_{SL} - \dot{m}_{thr})$$

wherein, K is a constant (K>0) and a gain of the lead filter. Further, a and b are calibratable parameters and the location of zero and pole of the lead filter, respectively. Parameter b, which is the pole of the lead filter, determines how fast the output of the lead filter decays to steady state. Parameter b may be calibrated such that the output of the filter has a fast transient. This calibration may reduce drivability losses that may occur if the CCRV opening is more than desired and/or the CCRV is opened for a longer than desired duration. Parameter a, in relation to b, may determine a quantity of additional flow requested initially by the filter. If parameter a is much smaller than parameter b, the filter output may initially spike high and decay to steady state according to a rate of change determined by parameter b. If parameter a is close to a value of parameter b, the initial spike may be smaller but the decay rate may be the same (determined by b). Thus, by tuning b, speed of the filter can be adjusted and by adjusting a, the amount of initial additional flow may be altered. Therefore, the parameters may be calibrated so that b>a≥0. It may be noted that if a=0, the applied filter may be a high-pass filter.

In the above equation, s is a complex Laplace transform variable. The lead compensated flow rate, $\dot{m}_{lead}$ may respond to rapid changes in throttle flow estimates. For example, a fast decrease in throttle mass flow rate may cause a rapid increase in $\dot{m}_{lead}$.

At 406, the recirculation flow rate, $\dot{m}_{ccrv}$ may be estimated as:

$$\dot{m}_{ccrv} = \dot{m}_{nom} + \max(0, \dot{m}_{lead} - c)$$

where, c is a calibratable parameter and c>0. Constant c may determine a threshold for minimum allowable $\dot{m}_{lead}$. Thus, $\dot{m}_{ccrv}$ is a combination (or sum) of $\dot{m}_{nom}$ and a clipped and shifted $\dot{m}_{lead}$. By selecting constant c such that small changes in throttle mass flow do not interfere with changes to the recirculation flow, $\dot{m}_{lead}$ may be shifted. Further, by selecting a maximum between zero and $\dot{m}_{lead} - c$, a minimum compressor recirculation flow rate of at least $\dot{m}_{nom}$ may be ensured. Thus, $\dot{m}_{lead}$ may be clipped. Therefore, during larger tip-out conditions, the controller may command the CCRV to allow an initial larger flow which may decay rapidly with time.

In this way, a diverted portion of compressed air may be increased during transient conditions by filtering the difference between the minimum desired flow required to reduce, and possibly prevent, surge and the airflow through the throttle. Further, the filtered difference may be modified so that a combination of the diverted portion of compressed air and the further diverted portion of compressed air is always at least equal to the minimum flow of compressed air needed to prevent surge. As another example, the compressor recirculation flow may be a combination of a nominal recirculation flow and a modified filtered nominal recirculation flow. The modified filtered nominal recirculation flow may be a clipped and shifted lead compensated flow rate. During transient conditions when larger changes in throttle mass flow (e.g. fast decreases) are encountered, the compressor recirculation flow may be a combination of nominal recirculation flow and an additional compressor recirculation flow based on the lead compensated flow rate. During conditions when throttle mass flow rate changes (e.g. decreases) are below a predetermined threshold, compressor recirculation flow may be equal to the nominal recirculation flow.

Returning now to map 260 of FIG. 2c, an example of compressor operation using the filtered flow rate is illustrated for situations when actuator delays are present and/or when throttle mass flow estimates are utilized to calculate compressor recirculation flow rate. Plot 216 depicts compressor operation wherein the surge limit is avoided by applying a filter to the nominal compressor recirculation flow rate. A fast decrease in airflow through the throttle may result in a quick response by the CCRV actuator. Accordingly, the CCRV may be opened to allow a larger recirculation flow such that compressor flow rate does not reduce substantially. As such, compressor operation can be maintained to the right of both, the calibrated surge (or soft surge) limit (line 206) and hard surge limit (line 202). In this way, transient response of the system is enhanced by using a lead compensator.

In one example, a system in a vehicle comprises an engine including an intake manifold, a throttle coupled to the intake manifold, a compressor for compressing aircharge delivered to the intake manifold, and a compressor recirculation passage coupling an outlet of the compressor to an inlet of the compressor. The compressor recirculation path may include a compressor recirculation valve that may be continuously variable. A controller may be configured with computer readable instructions for, during steady-state operating conditions, operating with the compressor recirculation valve closed. Then, in response to a transient change in airflow, the controller may operate with the compressor recirculation valve open. Transient changes in airflow may include a fast decrease in throttle flow rate. The controller may adjust an opening of the compressor recirculation valve to allow a compressor recirculation flow based on a combination of a nominal compressor recirculation flow and a filtered nominal compressor recirculation flow. As described earlier, the nominal compressor recirculation flow is a difference between a desired compressor flow rate based on a surge limit of the compressor and an estimated throttle mass flow rate. Further, the filtered nominal compressor recirculation flow may be modified such that the compressor recirculation flow is always at least equal to the nominal compressor recirculation flow. The modification may be in the form of clipping and shifting the filtered nominal compressor recirculation flow.

Now turning to FIG. 5, map 500 depicts example adjustments to the compressor recirculation valve based on changes in throttle mass flow to maintain the compressor out of the surge region. Map 500 depicts an operator pedal position (PP) at plot 502, throttle mass flow at plot 504, changes in throttle mass flow at plot 506, position of continuously variable compressor recirculation valve (CCRV) at plot 508, compressor recirculation flow at plot 510, and a surge margin at plot 512. All graphs are plotted over time of engine operation, along the x-axis. Line 507 represents a predetermined threshold for change in throttle mass flow rate. As such, line 507 may represent a threshold decrease such that any decrease in throttle mass flow that is greater than threshold 507 may indicate a demand for increased recirculation flow based on the filtered nominal compressor recirculation flow rate. Line 515 represents a surge limit below which surge (either soft surge or hard surge) may be experienced.

Prior to t1, the engine may be at steady-state conditions with no major change in pedal position (plot 502). A throttle mass flow (plot 504) may be adjusted based on pedal position so as to provide a requested torque demand. Prior to t1, since steady-state conditions may be present, throttle mass flow remains relatively the same, and consequently, change in throttle mass flow remains relatively close to zero (plot 506). In addition, at the operating conditions prior to t1, the margin to surge (plot 512) may be sufficient and the compressor state may be sufficiently above surge limit 515 such that the compressor state is in a no-surge region (region above surge limit 515). During such conditions, the CCRV may be maintained closed and recirculation mass flow may be suspended. As such, before t1, a flow rate through the compressor may be at or above a desired level, in particular, above a surge constrained compressor flow rate (as indicated by the compressor state being in the no-surge region).

At t1, due to a change in engine operating conditions (e.g., change in ambient conditions, or altitude), the surge margin may correspondingly decrease, and the compressor state may start moving towards the surge region (towards limit 515). In response to this change, at t1, the controller may open the CCRV slightly (plot 508) to increase compressor recirculation flow by a small amount (plot 510). By commencing recirculation flow, the compressor flow rate is increased to above the surge constrained level and the compressor state can be maintained in the no-surge region. As such, if the CCRV was not opened at t1, the surge margin may reduce below surge limit 515 and the compressor may move into the surge region, as shown by dotted line 516.

At t2, a smaller tip-out event may occur, as shown by plot 502, which results in a corresponding decrease in throttle mass flow rate. However, the change in throttle mass flow rate (D1) is smaller, and lower than the threshold (507). Accordingly, the CCRV position is maintained and recirculation flow rate remains the same, e.g. at nominal flow rate. At t3, a tip-in event may occur as an accelerator pedal is depressed. For example, the throttle may be at a wide open throttle position. In response to the rise in torque demand, throttle mass flow rate increases rapidly and a larger increase (I1) is observed in plot 506. Since throttle mass flow rate may be sufficient to sustain the desired compressed flow rate and surge margin may be maintained, the CCRV is closed and therefore recirculation mass flow may reduce to zero. After the tip-in at t3, the pedal demand may gradually decrease, and by t4 the engine may once again be in steady-state conditions. The throttle mass flow rate correspondingly decreases, but the decrease (D2) is below the threshold to affect the position of the CCRV.

At t4, the surge margin may again approach surge limit 515 due to changes in ambient conditions or altitude, and the CCRV may be partly opened to allow a smaller amount of recirculation flow. In response to the increase in compressor flow, surge margin rises above the surge limit 515 and surge region is avoided. As before, if CCRV was not opened at t4, compressor surge may have occurred as shown by plot 516.

At t5, an aggressive operator pedal tip-out event may occur. As a result of the drop in torque demand, and the corresponding decrease in airflow demand, a throttle opening may be decreased. For example, the throttle may be closed. Consequently, the throttle mass flow may drop substantially and the change in throttle mass flow (D3) may be greater than threshold 507. Therefore, to maintain the compressor in the no-surge region with the compressor flow rate above the surge constrained level, the CCRV may be adjusted to a fully open position to increase recirculation mass flow. Thus, additional recirculation flow may be directed from upstream of the throttle to the compressor inlet. Further, the additional compressor recirculation flow may be in excess of the nominal compressor recirculation flow flowing between t4 and t5. This additional recirculation flow may be based, as explained in reference to FIG. 4, on a filtered (e.g. lead compensated) difference between the minimum desired compressor flow to reduce compressor surge and existing airflow through the throttle. By increasing the recirculation mass flow in response to the drop in throttle mass flow, the compressor flow rate is kept above the surge constrained level and the compressor state can be maintained in the no surge region. As such, if the CCRV opening is not increased at t5, the surge margin may reduce further and compressor operation may move into a hard surge region (far below limit 515), as shown by dotted line 516. Furthermore, if the lead compensated difference is not included in estimating compressor recirculation flow, compressor surge may yet occur due to actuator delays in responding to a fully-open CCRV command.

Between t5 and t6, pedal demand may increase slightly and after t6, pedal demand may gradually increase and stabilize such that the engine may be operating at steady-state conditions past t6. Correspondingly, throttle mass flow may gradually increase and the CCRV may be returned to its partially open position such that recirculation mass flow reduces to about nominal compressor recirculation flow.

In this way, a likelihood of compressor surge during sudden decreases in throttle flow may be reduced. A surge margin may be maintained by applying additional compressor recirculation flow during sudden tip-outs in a controlled manner. By using a lead compensator to determine the additional compressor recirculation flow rate, a faster system response may be obtained. Accordingly, compressor surge due to errors in calculating throttle flow rates and/or CCRV actuator delays may be reduced. Further, a decrease in surge related NVH issues including noise and component damage issues may be achieved. Overall, engine performance may be improved.

Note that the example control and estimation routines included herein can be used with various engine and/or vehicle system configurations. The control methods and routines disclosed herein may be stored as executable instructions in non-transitory memory. The specific routines described herein may represent one or more of any number of processing strategies such as event-driven, interrupt-driven, multi-tasking, multi-threading, and the like. As such, various actions, operations, and/or functions illustrated may be performed in the sequence illustrated, in parallel, or in some cases omitted. Likewise, the order of processing is not necessarily required to achieve the features and advantages of the example embodiments described herein, but is provided for ease of illustration and description. One or more of the illustrated actions, operations and/or functions may be repeatedly performed depending on the particular strategy being used. Further, the described actions, operations and/or functions may graphically represent code to be programmed into non-transitory memory of the computer readable storage medium in the engine control system.

It will be appreciated that the configurations and routines disclosed herein are exemplary in nature, and that these specific embodiments are not to be considered in a limiting sense, because numerous variations are possible. For example, the above technology can be applied to V-6, I-4, I-6, V-12, opposed 4, and other engine types. The subject matter of the present disclosure includes all novel and non-obvious combinations and sub-combinations of the various systems and configurations, and other features, functions, and/or properties disclosed herein.

The following claims particularly point out certain combinations and sub-combinations regarded as novel and non-obvious. These claims may refer to "an" element or "a first" element or the equivalent thereof. Such claims should be understood to include incorporation of one or more such elements, neither requiring nor excluding two or more such elements. Other combinations and sub-combinations of the disclosed features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

The invention claimed is:

1. A method for a boosted engine comprising directing additional compressor recirculation flow, in excess of a nominal compressor recirculation flow, from upstream of a throttle to a compressor inlet via a compressor recirculation valve, said additional compressor recirculation flow based on a filtered difference between a minimum desired compressor flow to reduce compressor surge and existing airflow through said throttle.

2. The method recited in claim 1, wherein said nominal compressor recirculation flow is a difference between said minimum desired compressor flow to reduce compressor surge and said existing airflow through said throttle.

3. The method recited in claim 2, wherein said additional compressor recirculation flow is a larger amount of either zero or a minimum allowable additional compressor recirculation flow.

4. The method recited in claim 1, wherein said additional compressor recirculation flow is directed to said compressor inlet due to a change in airflow through said throttle, said change being greater than a threshold.

5. The method recited in claim 4, wherein said change in airflow through said throttle is a fast decrease in airflow through said throttle.

6. The method recited in claim 1, wherein said compressor recirculation valve is a continuously variable recirculation valve.

\* \* \* \* \*